United States Patent [19]
Mashige

[11] Patent Number: 5,601,627
[45] Date of Patent: Feb. 11, 1997

[54] METHOD FOR MOLDING OPTICAL ELEMENT

[75] Inventor: Masashi Mashige, Kawasaki, Japan

[73] Assignee: Canon Kabushiki Kaisha, Tokyo, Japan

[21] Appl. No.: 400,384

[22] Filed: Mar. 3, 1995

Related U.S. Application Data

[63] Continuation of Ser. No. 63,685, May 20, 1993, abandoned.

[30] Foreign Application Priority Data

May 21, 1992 [JP] Japan .................................. 4-153103
Apr. 19, 1993 [JP] Japan .................................. 5-114188

[51] Int. Cl.⁶ .................... C03B 23/00; C03B 11/00; B29D 11/00
[52] U.S. Cl. ................... 65/102; 65/104; 65/85; 264/1.1; 264/1.32
[58] Field of Search ................... 65/64, 66, 69, 65/77, 83, 85, 111, 117, 137, 102, 103, 104; 264/1.32, 2.3, 1.1

[56] References Cited

U.S. PATENT DOCUMENTS

| | | | |
|---|---|---|---|
| 3,833,347 | 9/1974 | Angle et al. | 65/32.5 |
| 4,629,489 | 12/1986 | Hirota et al. | 65/83 |
| 4,778,505 | 10/1988 | Hirota et al. | 65/77 |
| 4,915,720 | 4/1990 | Hirota et al. | 65/64 |
| 4,969,944 | 11/1990 | Marechal | 65/85 |
| 5,032,160 | 7/1991 | Murata et al. | 65/64 |
| 5,087,279 | 2/1992 | Monji et al. | 65/77 |
| 5,173,100 | 12/1992 | Shigyo et al. | 65/85 |
| 5,228,894 | 7/1993 | Sato et al. | 65/85 |

FOREIGN PATENT DOCUMENTS

| | | | |
|---|---|---|---|
| 61-48432 | 3/1986 | Japan | 65/83 |
| 61-227928 | 10/1986 | Japan | 65/66 |
| 62-230633 | 10/1987 | Japan | 65/66 |
| 62-292636 | 12/1987 | Japan . | |
| 62-292629 | 12/1987 | Japan | 65/66 |

*Primary Examiner*—Donald E. Czaja
*Assistant Examiner*—Steven P. Griffin
*Attorney, Agent, or Firm*—Fitzpatrick, Cella, Harper & Scinto

[57] ABSTRACT

There is disclosed a method for molding an optical element, by preparing an upper mold member and a lower mold member for press molding a glass material, heating the mold members together or individually to a predetermined temperature, deforming the glass material according to molding faces of the mold members by a pressing force applied to the mold members, then transferring the mold members and the molded glass to a cooling step and subsequently taking out the molded glass by opening the mold members, thereby transferring the optically functional faces corresponding to the molding faces of the mold members, to the glass material. The cooling step includes a step of opening the mold members to separate the glass material from the molding faces of the mold members to release the adhesion state upon press molding between the molding faces and the glass material, and a step of closing the mold members again so as to maintain the molded state of the glass material and cooling the molded glass in this state further to a taking-out temperature thereof.

3 Claims, 6 Drawing Sheets

METHOD FOR MOLDING OPTICAL ELEMENT

This application is a continuation of application Ser. No. 08/063,685 filed May 20, 1993, now abandoned.

BACKGROUND OF THE INVENTION

1. Field of the Invention

The present invention relates to an optical element molding method for molding an optical element such as a highly precise glass lens by pressure molding a softened glass material.

2. Related Background Art

With the reduction in size and weight of optical equipment, aspherical glass lenses are desired for use in the optical system. Since it is difficult to produce such lenses by ordinary polishing operation, there is being developed a method for producing an optical element without a post-working step such as polishing, by placing a glass material for producing the element such as a glass blank preliminarily molded to certain shape and surface precision between upper and lower mold members of a predetermined surface precision, and press molding the glass material under heating.

In such method for producing an optical element by press molding, as already disclosed in the Japanese Patent Publication No. 62-292636, a glass material is sandwiched between mold members for molding the optical element, then is heated, together with the mold members, to a temperature above the yield point of the glass and is pressed to the predetermined shape. Subsequently, the glass material is cooled to a temperature below the glass transition point while it is pressurized by the mold members, and is then taken out from the mold members to obtain a highly precise optical element. In this process, the mold members together with a cylindrical mold constitute a molding block, and the optical element is molded during transporting of the block to the stages of heating, pressing and cooling while the glass material is held in the block.

However, when the glass material is cooled to the temperature below the glass transition point while it is pressurized by the mold members, the mold members and the glass material are maintained in close contact, and, due to the difference in the contractions of the mold members and the glass material resulting from the difference in the thermal expansion coefficients thereof, a thermal stress is generated in the glass material. After the mold members are opened, the thermal stress is released, whereby a deformation is generated in the molded optical element.

SUMMARY OF THE INVENTION

In consideration of the foregoing, the object of the present invention is to provide a method for molding an optical element, capable of avoiding unnecessary thermal stress or strain in the cooling step and maintaining the optically functional face of the final molded product in a highly precise state of molding.

The above-mentioned object can be attained, according to the present invention, by a method for molding an optical element by preparing an upper mold and a lower mold for press molding a glass material, heating the mold members together or individually to a predetermined temperature, deforming the glass material along the molding faces of the mold members by a pressing force applied to said mold members, then effecting a cooling step on the mold members and molded glass after the molding thereof, then opening the mold members and taking out the molded glass thereby transferring the optically functional faces corresponding to the molding faces of the mold members to said glass material, wherein the cooling step includes a step of opening the mold members to separate said glass material from the molding faces of said mold members, thereby releasing the close contact state between the molding faces and the glass material during the press molding, and a step of closing the mold members again in order to maintain the molded state of the molded glass to cool the molded glass to the taking-out temperature thereof in such closed state of the mold members.

Other objects of the present invention, and the features thereof, will become fully apparent from the following description.

DESCRIPTION OF THE PREFERRED EMBODIMENTS

Figure 7:
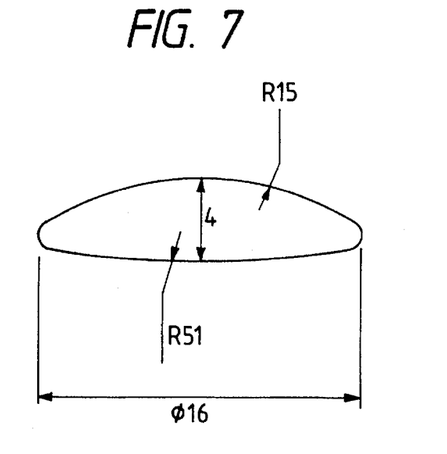
FIG. 7 is a cross-sectional view showing an example of dimensions of a convex lens.

Now the present invention will be explained in detail by an embodiment thereof shown in the attached drawings. In the following there will be shown a case of molding a biconvex lens from a spherical glass blank, composed of heavy crown glass SK12, having specified values of thermal characteristic temperatures as shown in Table 1. The molded convex lens has, for example, a shape and dimensions as shown in FIG. 7.

TABLE 1

| Name | Strain point StP | Anneal point AP | Transition point Tg | Yield temp. AT | Softening point SP |
|---|---|---|---|---|---|
| Viscosity log η | 14.5 | 13 | 12–13 | 11 | 7.65 |
| Temp. (°C.) | 503 | 534 | 550 | 588 | 672 |

The yield point is defined as follows: When a specimen of glass bar (for example, length of 50 mm diameter of 4 mm) fully annealed is heated uniformly at constant rate of 4° C./min. under loading of 50 g thereto in axial direction, the elongation and temperature are accurately measured, thereby obtaining a glass thermal expansion curve. In the thermal expansion curve, there is an inflexion point that the specimen apparently stops elongating and then starts contracting due to deformation caused by softening of the glass with elevating of the temperature. This inflexion point where glass is apparently changed from the expansion to the contraction, is called the yield point.

Figure 1A:
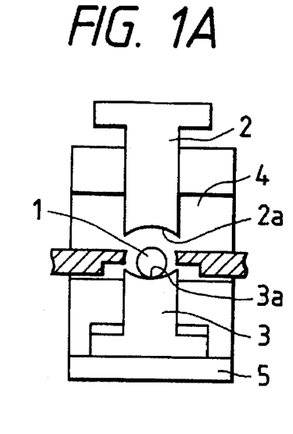
FIGS. 1A to 1E are schematic views showing the sequence of operations in an embodiment of the molding method of the present invention.

Mold member s shown in FIGS. 1A to 1E are contained in a casing (not shown), into which nitrogen is introduced after evacuation for example to a pressure of $1\times10^{-2}$ Torr. An upper mold member 2 and a lower mold member 3 are heated close to 620° C. (corresponding to a glass viscosity of $10^{9.7}$ (poise) for example by a heater (not shown) provided in a cylindrical mold 4 surrounding the molds. When the mold members 2, 3 are heated to the above-mentioned temperature, the glass material 1 which is preliminarily heated (for example to 620° C.) in advance in the same casing, is taken up for example by a suction hand 9 and is placed on a molding face 3a of the lower mold member 3 through an aperture provided in the cylindrical mold 4 (FIG. 1A). The cylindrical mold 4 is mounted on a base member 5.

Figures 1B, 1C:
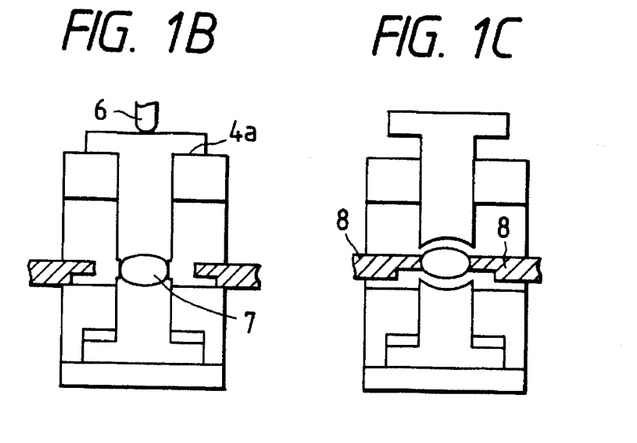

Then, the upper mold member 2 is lowered by operation means 6 such as a ram, thereby effecting press molding. The glass material 1 may be heated to 620° C. (corresponding to a glass viscosity of $10^{9.7}$ poise) in advance as explained above, and then loaded between the mold members 2, 3, but it may be heated to the temperature after loading. The descent of the upper mold member 2 is continued until a stopper portion provided at the upper end of the mold 2 member comes into contact with the upper face 4a of the cylindrical mold 4, and, in the course of the descent, the shapes of molding faces 2a, 3a of the mold members 2, 3 are transferred to the surface of the glass material 1, whereby it is molded into a predetermined product (FIG. 1B). The employed pressing load is 320 kgf, and the thickness of the molded article 7 is determined by the contacting level between the stopper portion and the upper face 4a of the cylindrical mold 4.

Then, the heater is deactivated, and the cooling is executed by introducing, for example, nitrogen into cooling paths (not shown) provided in the mold members 2, 3. When the molded article (optical element) 7 reaches 580° C. (corresponding to a glass viscosity of $10^{11}$ poise; molding pressure being zero), the molded article 7 is interposed from both sides thereof by fixing means 8 provided with spring mechanisms, and the upper mold member 2 is elevated to separate the article 7 from the molding face 2a. Then, the fixing means 8 is slightly elevated to separate the molded article 7 from the molding face 3a of the lower mold member 3 (FIG. 1C).

Figure 1D:
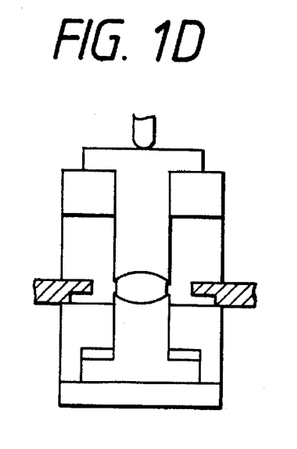

Subsequently, the fixing means 8 is returned to the original level, thereby placing the molded article 7 on the molding face 3a, then the upper mold member 2 is lowered to the original state (FIG. 1B), and the fixing means 8 is retracted from the mold to the outside (FIG. 1D). The above-mentioned operations are executed promptly (with a temperature descent of about 5° C.). After the mold members are closed (with zero pressure), the upper and lower mold members 2, 3 and the molded article 7 are cooled to a temperature below the transition point of glass, for example, to 480° C. During this cooling operation, the molded article 7 is prevented from deformation caused by the dead weight thereof, by the function of the molding faces 2a, 3a of the mold members 2, 3, thereby maintaining the desired shape. The thermal stress and strain generated in the glass material before the mold members are opened, due to the difference in thermal expansion coefficient from the mold members, are eliminated by the viscoelasticity of the glass material.

Figure 5:
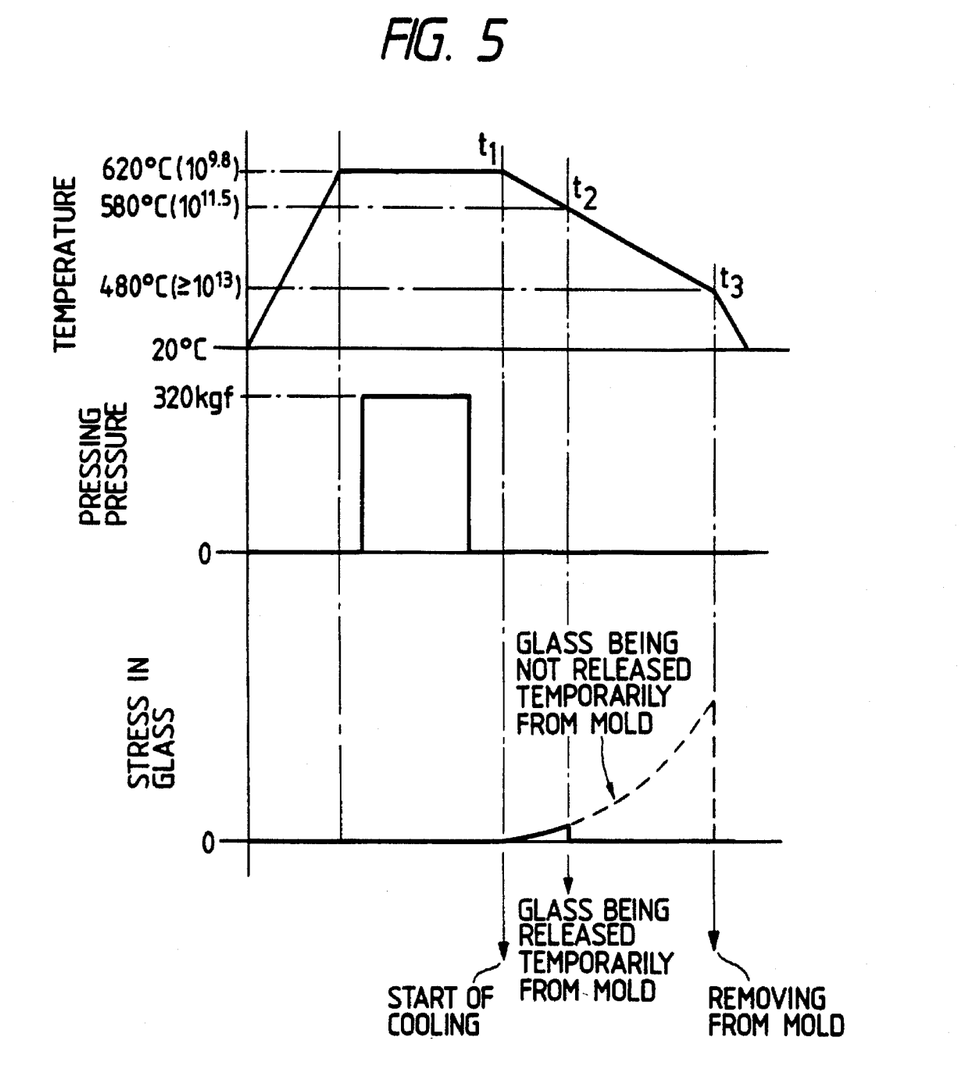
FIG. 5 is a chart showing an example of control values in time in the molding method of the present invention for producing a glass optical element.

The variations in temperature, molding pressure and stress generated in the glass material in the molding method of the present invention can be represented by a chart shown in FIG. 5. In FIG. 5, a broken line indicates the variation in stress in the conventional method, in which the opening of the mold members in the course of cooling step as the present invention, is not conducted. A point $t_1$ indicates the start of cooling, while a point $t_2$ indicates the timing of temporary mold releasing, and a point $t_3$ indicates the timing of removing the molded article from the mold members.

Figure 6A:
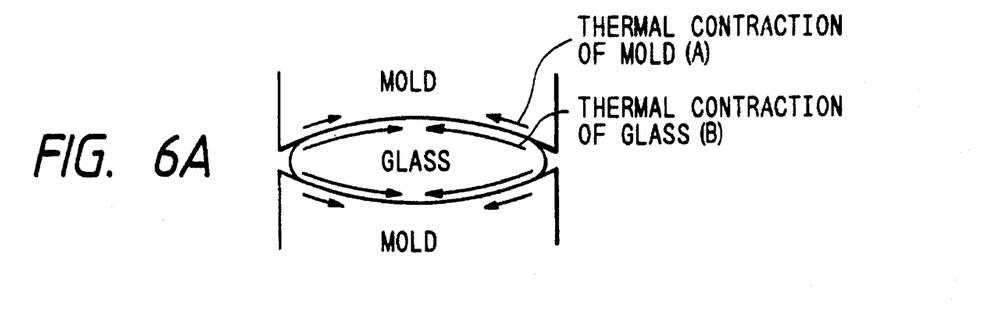
FIGS. 6A to 6D are schematic cross-sectional views showing the mechanism of thermal stress generation in the glass material in the present invention.
Figure 6B:
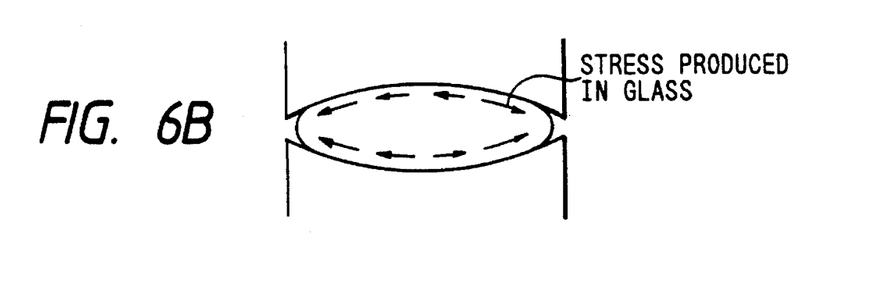
Figure 6C:
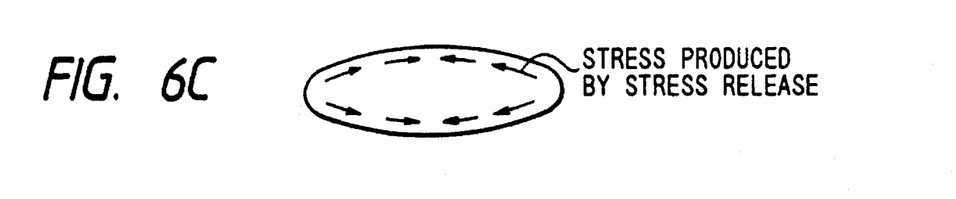
Figure 6D:
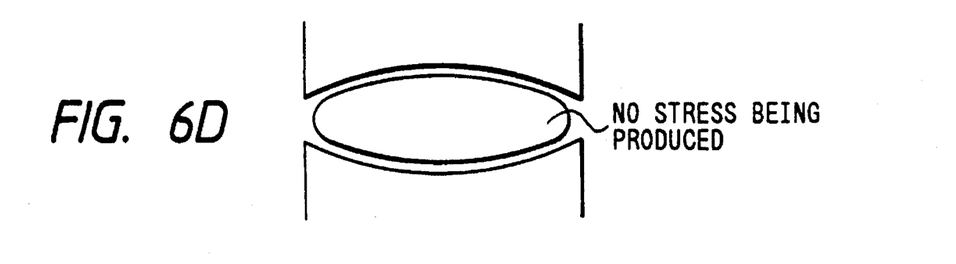

FIGS. 6A to 6D schematically show the state of thermal stress generated in the glass material. Since the thermal contraction B of the glass material is larger than the thermal contraction A of the mold members 2, 3 (FIG. 6A), a stress corresponding to the difference of the contractions is generated in a direction opposite to the illustrated arrows (FIG. 6B). This is presumably due to generation, on the molding faces of the mold members at the press molding, of an adhesion state such as molecular bonding between the mold surface and the glass surface in physical sense. If the cooling is continued in this state and the mold members 2, 3 are opened at the end of cooling as in the conventional molding method, the internal stress is released at once as shown in FIG. 6C upon releasing of the glass from the mold, whereby a deformation is induced in the glass material (arrows indicating forces generated by the release of stress).

In the molding method of the present invention, however, in the course of cooling after press molding, the mold members 2, 3 are opened to separate the glass material from the molding faces of the mold members and to eliminate the adhesion state between the molding faces and the glass material in the press molding at a temperature range of the glass material corresponding to a glass viscosity of $10^{10}$ to $10^{12}$ poise, preferably at a glass temperature corresponding to a glass viscosity of $10^{11}$ poise, thereby relaxing the internal stress of glass generated in the cooling process up to this point and releasing the thermal stress accumulated thus far. Consequently, when the mold members are closed again in order to maintain the molded state of glass and the molded glass is cooled in this state to the taking-out temperature, there is no longer generated the thermal stress in this process. This is presumably due to a fact that, once the molded glass surface is separated from the molding faces, the aforementioned molecular bond state is not established even when the mold members 2, 3 are closed again and the molecules of the atmosphere enter between the surfaces, thereby preventing re-establishment of such molecular bond state and enabling mutual sliding movement of the surfaces.

Figure 1E:
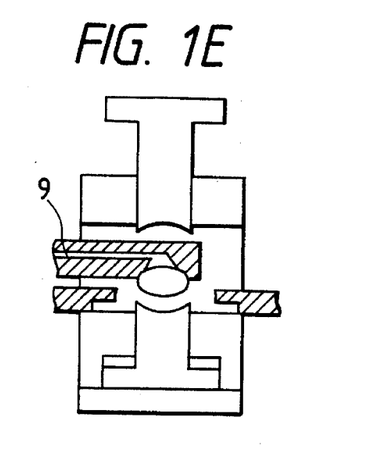

Then, the mold members are again opened at a predetermined taking-out temperature (where the molded glass is not deformed by the dead weight thereof), for example, 480° C. (corresponding to a glass viscosity of $10^{13}$ poise or less), and the completed molded article 7 without thermal stress or strain can be removed by the suction hand 9 (FIG. 1E). In this operation, the suction hand is maintained at about 400° C., in order not to give thermal shock to the molded article 7 and in consideration of the subsequent temperature loss of the molded article to the taking-out (removing) operation.

The optical element actually molded in the above-explained molding apparatus showed a satisfactory surficial precision of ¼ Newton's rings or less, both in the astigmatism and in the contour map of the surface.

Figure 2:
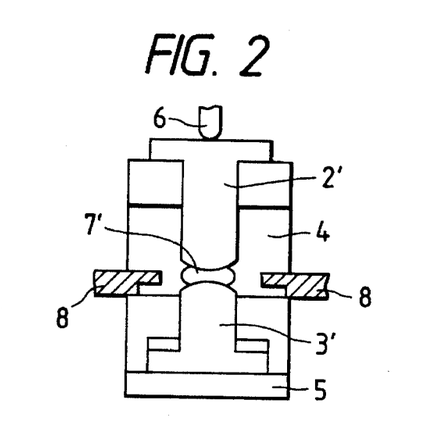
FIG. 2 is a schematic view of another embodiment.
Figure 8:
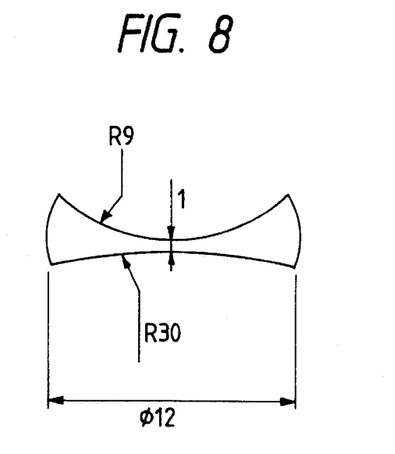
FIG. 8 is a cross-sectional view showing an example of dimensions of a concave lens.

Another embodiment shown in FIG. 2 employs flint glass F8 for molding a concave optical element. In this case, after the glass blank is placed on the lower mold member 3' for molding concave lens, it is positioned at the center of the mold member by means of the aforementioned fixing means 8 between lower member 3' and upper member 2', for molding concave lens 7'. Other operations and the obtained results are similar to those in the foregoing embodiment both the formation of the concave lens 7'. The concave element has a shape and dimensions as shown in FIG. 8.

In the foregoing embodiments, the optical element may have convex or concave optically functional faces. The operation of separating the upper and lower mold members from the glass material is preferably conducted in prompt manner (for example within about 4 seconds).

Figure 3:
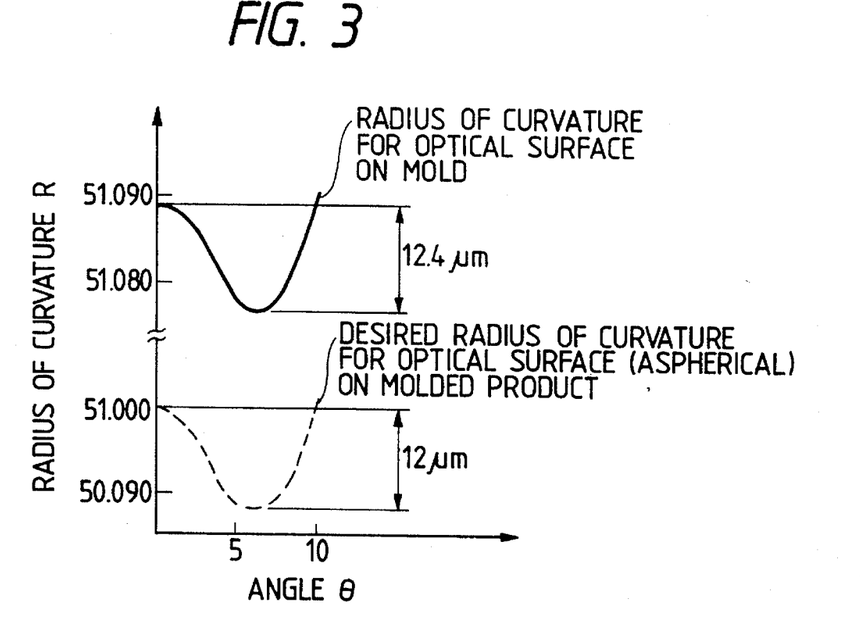
FIGS. 3 and 4 are charts showing examples of the relationship between the dimension of the optical element and that of the mold.
Figure 4:
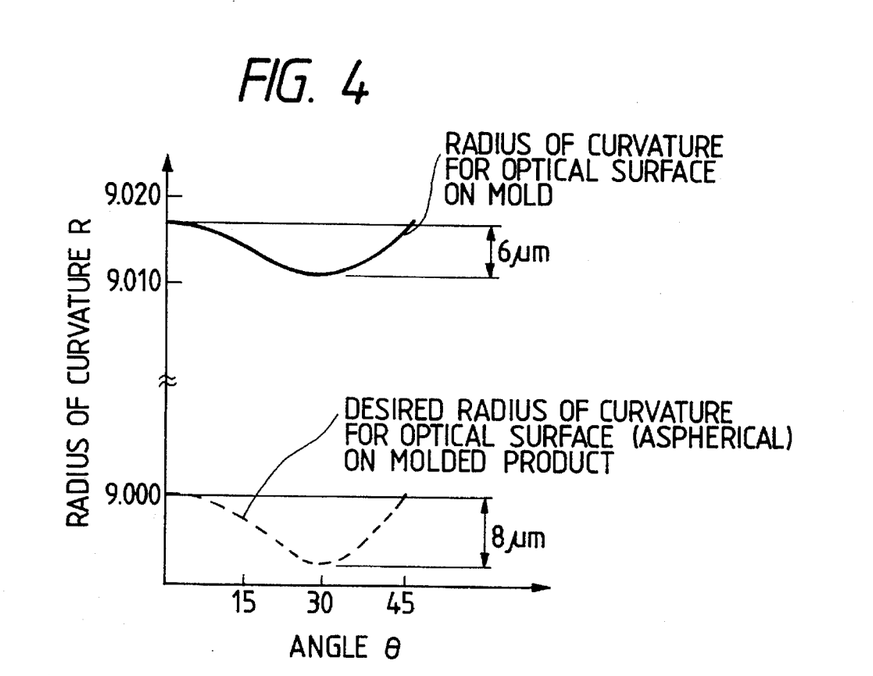

FIGS. 3 and 4 show comparison of the radii of curvature of the desired optical element (having a convex face with R=51 mm and a concave face with R=9 mm) and those of the molding faces of the mold members, when the molding method of the present invention is executed. The radii of curvature of the mold members are determined in consideration of the difference in thermal expansion coefficient, between the mold members and the molded product.

Figure 9:
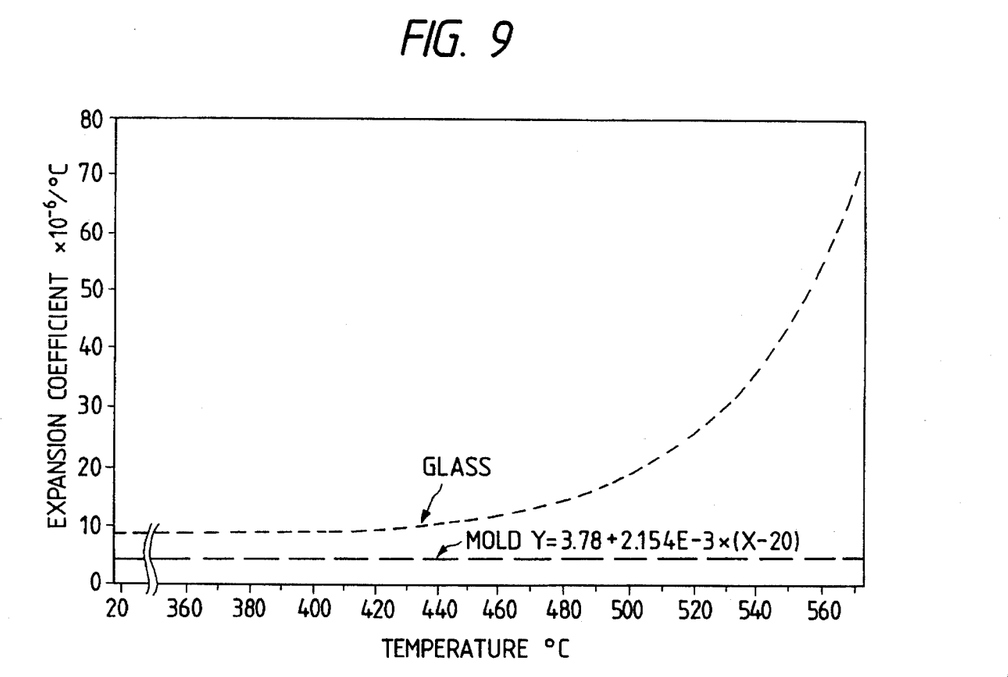
FIG. 9 is a chart showing temperature dependence of expansion coefficients of glass and mold members.

In the following there will be explained a simulation of the thermal stress generated in the glass material in the course of cooling, utilizing a general-purpose structure analyzing software "MARC", supplied by Japan Marc Co., Ltd. The physical properties of glass and mold members, shown in Tables 1 and 2, are entered as the reference data. The temperature dependences of the thermal expansion coefficients of glass and mold members are as shown in FIG. 9.

TABLE 2

| Physical property | Unit | Glass | Mold members |
|---|---|---|---|
| Thermal conductivity | W/m · K | 1.34 | 71.2 |
| Specific heat | kj/kg · K | 0.967 | 0.265 |
| Density | kg/m$^3$ | 3.19 × 10$^3$ | 1.47 × 10$^3$ |
| Poisson's ratio | | 0.25 | 0.22 |
| Expansion coefficient | /°C. | 9.0 × 10$^{-6}$ | 3.78 × 10$^{-6}$ |
| | values being at room temperature (temperature dependence shown in FIG. 9 being taken into consideration) | | |
| Elastic modulus (mold) | kg/m$^2$ | | 6.22 × 10$^{10}$ |
| Viscoelasticity | Data on viscoelastic properties of glass | | |

The viscoelastic properties of glass shown in Table 2 can be determined in the following manner. At first a glass specimen in a viscoelastic temperature range is subjected to a bending test in which the specimen maintained at a constant temperature is subjected to a constant load in three-point support, and the deflection of the specimen is measured, and the creep compliance is calculated from the following equation. This calculation is repeated at slightly different temperatures, thereby determining a creep curve:

$$D_c(t, TO) = 4bd^3/l^3 \times v(t)/WO$$

wherein $D_c(t, TO)$: creep compliance b: width of specimen d: length of specimen l: length of span v(t): deflection at load point WO: load.

Since the glass in the viscoelastic temperature region has simple thermo-rheological properties, the creep compliance curves at different temperatures can be normalized to a master curve by a displacement in lateral direction (in time axis). The relationship between temperature and time in this case can be represented by a time-temperature shift factor. The time-temperature shift factor for the glass in this case can be approximated by two straight lines (Arrhenius' equation), and the temperature of the crossing point thereof is somewhat lower than the glass transition point.

The relaxing elastic coefficient (corresponding to the elastic coefficient in an elastomer) can be represented as a function of temperature and time, because of the influence of decrease of stress relaxation. However, since the glass has a simple behavior in thermo-rheological properties, there can be obtained a master curve, as in the case of the creep compliance. (In general, the master curve of the relaxing elastic coefficient can be approximated by the reciprocal of the creep compliance.)

The behavior of a viscoelastic substance, which is simple in the thermo-rheological properties, such as glass, can be represented by the following hysteresis integration in the linear viscoelastic theory, by determining the relaxing elastic coefficient $E_r$ (t, TO) at a temperature and a time from the master curve of the relaxing elastic coefficient and the time-temperature shift factor:

$$\sigma_{(t)} = \int_0^t E_r(t, TO) \cdot \frac{d\epsilon(\tau)}{d\tau} \, d\tau$$

wherein $\tau$ is time of analysis, $\sigma(t)$ is stress, and $\epsilon(t)$ is strain.

Therefore, in order to add the viscoelastic properties to the numerical analysis, it becomes necessary to represent the master curve of the relaxing elastic coefficient and the time-temperature shift factor in numerical equations. Since the time-temperature shift factor can be approximated by the Arrhenius' equation as explained above, it can be analyzed by the analyzing software MARC of Japan MARC Co., Ltd., with the data inputs of the equations of straight lines and the crossing point thereof. Also, the master curve of the relaxing elastic coefficient can be approximated by the following Prony development:

$$E_r(t, TO) = \sum_{n=1}^{N} E_r^n \cdot \exp(-t/t'^n)$$

wherein $t'^n$ is conversion time of n-th order, and $E_r^n$ is relaxing elastic coefficient of n-th order.

Figure 10:
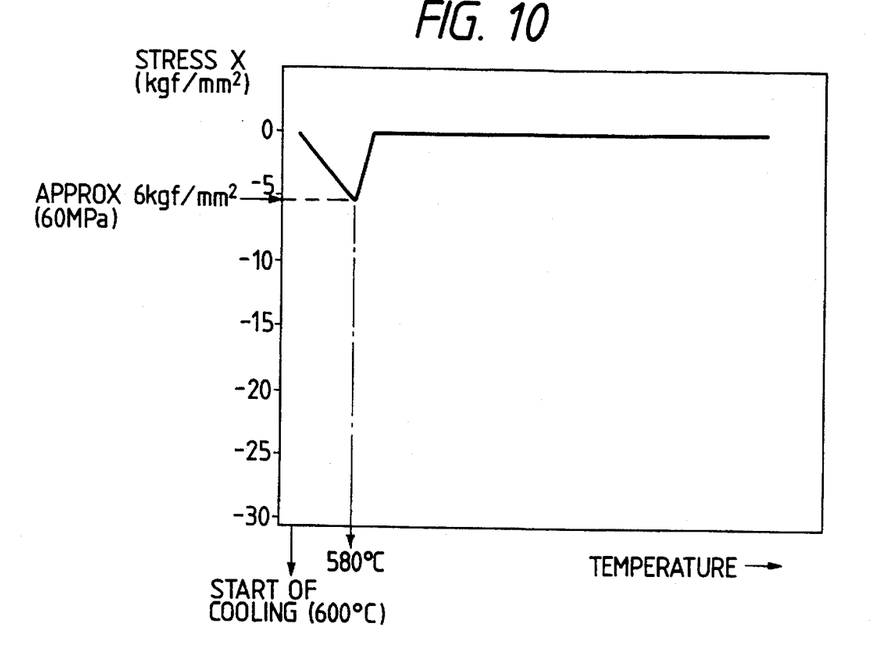
FIG. 10 is a chart showing the state of accumulation of thermal stress generated in the glass material in the method of the present invention.
Figure 11:
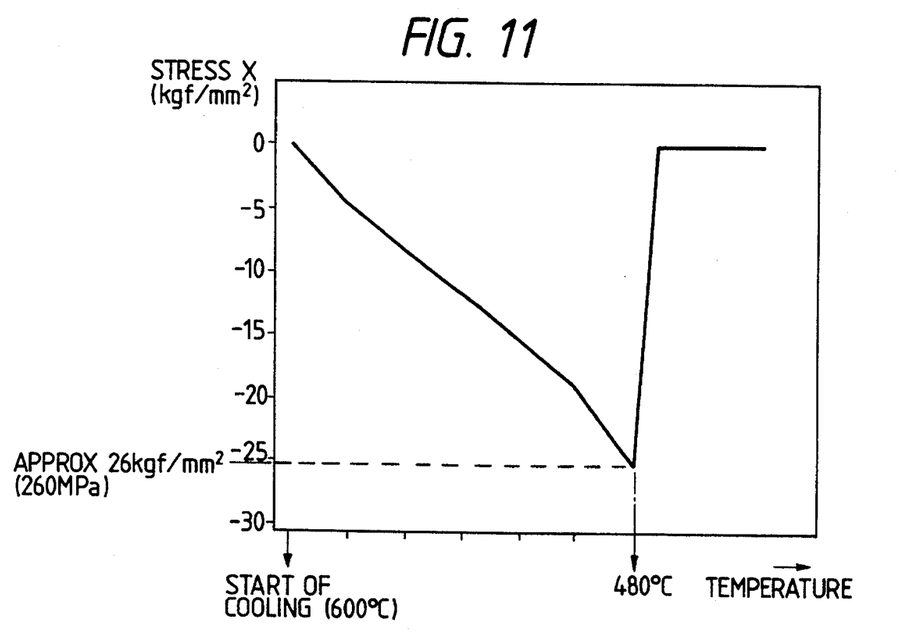
FIG. 11 is a chart showing the state of accumulation of thermal stress generated in the glass material in the conventional method.

As a result of such simulation, in the method of the present invention in which a temporary mold separation is conducted in the course of cooling, the thermal stress generated in the glass is almost zero after said mold separation as indicated by a monitor display shown in FIG. 10, whereas the internal thermal stress in the conventional method is gradually accumulated until the molded article is taken out from the molds as shown in FIG. 11, thus inducing a significant strain.

As detailedly explained in the foregoing, the present invention is featured by opening the mold members thereby releasing the glass material from the molding faces of the mold members in the course of cooling after the press molding, then closing the mold members again in order to maintain the molded state of the glass material, and cooling said glass material in this state until the taking-out temperature. It is thus rendered possible to obtain an excellent effect of maintaining the optically functional faces of the final molded article in a highly precise desired state of molding, without leaving unnecessary thermal stress or strain in the course of cooling.

What is claimed is:

1. A method for molding an optical element sequentially comprising a molding step, a cooling and a separating step, and a removal step, wherein said molding step comprises:
   (i) providing an upper mold member and a lower mold member for press molding a glass material, each of said upper mold member and said lower mold member being in a casing;
   (ii) placing the glass material on a molding face of said lower mold member and lowering said upper mold member so that a molding face of said upper mold member comes into contact with the glass material to close said upper and lower mold members, to effect press molding of said glass material, wherein the glass material is in contact with both the molding face of the lower mold member and the molding face of the upper mold member by said closing of said upper and lower mold members;
   (iii) heating said upper and said lower mold members with the glass material in between to a predetermined temperature;
   (iv) shaping the glass material according to the molding faces of said upper and said lower mold members by applying a pressing force to said glass material, thereby forming a molded optical glass element by transferring an optically functional face to said glass material, corresponding to the molding faces of said upper and said lower mold members;

wherein said cooling and separating step comprise:
   (i) cooling said upper mold member and said lower mold member and said molded optical glass element, wherein the cooling comprises the steps of; cooling said upper mold member and said lower mold member by cooling means to a predetermined temperature, and then rapidly separating said molded optical glass element from said contact with the molding faces of the upper mold member and the lower mold member, thereby relaxing internal stress in said molded optical glass element;
   (ii) returning said molded optical glass element to the molding face of the lower mold member and lowering said upper mold member to close said lower and said upper mold members again so as to maintain the shape of the molded optical glass element without any deformation of the molded optical glass element; and wherein said removal step comprises:
   (i) executing a cooling step on said upper and lower mold members until a removal temperature for said molded optical glass element is reached; and executing a removal step of said molded optical glass element comprising separating said upper mold member from said lower mold member and the molded optical glass element by elevating said upper mold member; and
   (ii) removing the molded optical glass element from said lower mold member.

2. A method for molding an optical element sequentially comprising a molding step, a cooling and a separating step, and a removal step, wherein said molding step comprises:
   (i) providing an upper mold member and a lower mold member for press molding a glass material, each of said upper mold member and said lower mold member being in a casing;
   (ii) placing the glass material on a molding face of said lower mold member and lowering said upper mold member so that a molding face of said upper mold member comes into contact with the glass material to close said upper and lower mold members, to effect press molding of said glass material, wherein the glass material is in contact with both the molding face of the upper mold member and the molding face of the lower mold member by said closing of said upper and lower mold members;
   (iii) heating said upper and said lower mold members with the glass material in between to a predetermined temperature;
   (iv) shaping the glass material according to the molding faces of said upper and said lower mold members by applying a pressing force to said glass material, thereby forming a molded optical glass element by transferring an optically functional face to said glass material corresponding to the molding faces of said upper and said lower mold members;

wherein said cooling and separating step comprise:
   (i) cooling said upper mold member and said lower mold member and said molded optical glass element by cooling means to within a temperature range corresponding to a glass viscosity of said molded optical glass element of $10^{10}$ to $10^{12}$ poise and then rapidly separating said molded optical glass element from the molding faces of said upper mold member and said lower mold member by releasing an adhesion between said molded optical glass element and the molding faces, thereby relaxing internal stress produced in said molded optical glass element during cooling;
   (ii) returning said molded optical glass element to the molding face of the lower mold member and lowering said upper mold member to close said lower and said upper mold members again so as to maintain the shape of the molded optical glass element without any deformation of the molded optical glass element; and wherein said removal step comprises:
   (i) executing a cooling step on said upper and said lower mold members until a removal temperature for said molded optical glass element is reached; and executing a removal step of said molded optical glass element comprising separating said upper mold member from said lower mold member and the molded optical glass element by elevating said upper mold member; and
   (ii) removing the molded optical glass element from said lower mold member.

3. A method for molding an optical element sequentially comprising a molding step, a cooling and a separating step, and a removal step, wherein said molding step comprises:
   (i) providing an upper mold member and a lower mold member for press molding a glass material, each of said upper mold member and said lower mold member being in a casing;
   (ii) placing the glass material on a molding face of said lower mold member and lowering said upper mold member so that a molding face of said upper mold member comes into contact with the glass material to close said upper and lower mold members, to effect press molding of said glass material, wherein the glass material is in contact with both the molding face of the lower mold member and the molding face of the upper mold member by said closing of said upper and lower mold members;

(iii) heating said upper and said lower mold members with the glass material in between to a predetermined temperature;

(iv) shaping the glass material according to the molding faces of said upper and said lower mold members by applying a pressing force to said glass material, thereby forming a molded optical glass element by transferring an optically functional face to said glass material corresponding to the molding faces of said upper and said lower mold members;

wherein said cooling and separating step comprises:
(i) cooling said upper mold member and said lower mold member and said molded optical glass element by cooling means to within a temperature range corresponding to a glass viscosity of said molded optical glass element of $10^{10}$ to $10^{12}$ poise and then rapidly separating said molded optical glass element by releasing said molded optical glass element from the contact with the molding faces of said upper mold member and said lower mold member by releasing an adhesion between said molded optical glass element and the molding faces, thereby relaxing internal stress produced in said molded optical glass element during cooling;

(ii) returning said molded optical glass element to the molding face of the lower mold member and descending said upper mold member to close said lower and said upper mold members again so as to maintain the shape of the molded optical glass element without any deformation of the molded optical glass element; and wherein said removal step comprises:
(i) executing a cooling step on said upper and lower mold members until a removal temperature for said molded optical glass element is reached which corresponds to a glass viscosity of said molded optical glass element of $10^{13}$ poise or lower; and executing a removal step comprising separating said upper mold member from said lower mold member and the molded optical glass element by elevating said upper mold member; and (ii) removing the molded optical glass element from said lower mold member.

\* \* \* \* \*

UNITED STATES PATENT AND TRADEMARK OFFICE
CERTIFICATE OF CORRECTION

PATENT NO. : 5,601,627

DATED : February 11, 1997

INVENTOR(S) : MASASHI MASHIGE

Page 1 of 2

It is certified that error appears in the above-identified patent and that said Letters Patent is hereby corrected as shown below:

COLUMN 2

Line 2, "glass" should read --glass,--.

COLUMN 3

Line 2, "50 mm" should read --50 mm,--; and
   Line 17, "(poise)" should read --poise)--.

COLUMN 4

Line 13, "as" should read --as in--.

COLUMN 5

Line 6, "lens," should read --lens 7',--; and
   Line 10, "both" should read --for--.

COLUMN 7

Line 35, "comprise:" should read --comprises:--.

UNITED STATES PATENT AND TRADEMARK OFFICE
CERTIFICATE OF CORRECTION

PATENT NO. : 5,601,627

DATED : February 11, 1997

INVENTOR(S) : MASASHI MASHIGE

It is certified that error appears in the above-identified patent and that said Letters Patent is hereby corrected as shown below:

COLUMN 8

Line 25, "comprise:" should read --comprises:--.

Signed and Sealed this

Twenty-sixth Day of August, 1997

Attest:

BRUCE LEHMAN

Attesting Officer

Commissioner of Patents and Trademarks